United States Patent
Li et al.

(10) Patent No.: US 9,842,225 B2
(45) Date of Patent: Dec. 12, 2017

(54) METHOD AND APPARATUS FOR CONTROLLING A BROWSER

(71) Applicant: Tencent Technology (Shenzhen) Company Limited, Shenzhen, Guangdong (CN)

(72) Inventors: Wei Li, Shenzhen (CN); Ying Huang, Shenzhen (CN); Huijiao Yang, Shenzhen (CN); Ruiyi Zhou, Shenzhen (CN); Tingyong Tang, Shenzhen (CN); Bo Hu, Shenzhen (CN); Kai Zhang, Shenzhen (CN); Renfang Liu, Shenzhen (CN); Zhipei Wang, Shenzhen (CN); Cheng Feng, Shenzhen (CN); Zhengkai Xie, Shenzhen (CN); Xi Wang, Shenzhen (CN); Yulei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 168 days.

(21) Appl. No.: 14/807,423

(22) Filed: Jul. 23, 2015

(65) Prior Publication Data

US 2015/0332065 A1 Nov. 19, 2015

Related U.S. Application Data

(63) Continuation of application No. PCT/CN2014/072930, filed on Mar. 5, 2014.

(30) Foreign Application Priority Data

Mar. 5, 2013 (CN) .......................... 2013 1 0068933

(51) Int. Cl.
*H04L 29/06* (2006.01)
*G06F 21/62* (2013.01)
(Continued)

(52) U.S. Cl.
CPC .... *G06F 21/6245* (2013.01); *G06F 17/30994* (2013.01); *G06F 21/32* (2013.01); *H04L 67/02* (2013.01)

(58) Field of Classification Search
USPC .................................................. 726/4, 5, 28
See application file for complete search history.

(56) References Cited

U.S. PATENT DOCUMENTS

| 2008/0028444 A1* | 1/2008 | Loesch ............. G06F 17/30902 726/4 |
| 2012/0036565 A1* | 2/2012 | Gamez .................... G06F 21/41 726/5 |

(Continued)

FOREIGN PATENT DOCUMENTS

| CN | 102375951 A | 3/2012 |
| CN | 102467566 A | 5/2012 |

(Continued)

OTHER PUBLICATIONS

The State Intellectual Property Office of the People's Republic of China (SIPO) Office Action 1 for 201310068933.X dated May 27, 2017 pp. 1-9.

*Primary Examiner* — Jason Lee
(74) *Attorney, Agent, or Firm* — Anova Law Group, PLLC

(57) ABSTRACT

A method and apparatus for controlling a browser are provided. The method includes: acquiring a characteristic identifier of a user; comparing the characteristic identifier of the user with a pre-stored benchmark characteristic identifier to determine whether the characteristic identifier is identical to the benchmark characteristic identifier; if the characteristic identifier is identical to the benchmark characteristic identifier, entering a pre-set private browsing mode wherein a browser plug-in saves the browsing history data of the user; and when the user completes the browsing, receiving (Continued)

an instruction from the user to close the plug-in and exit the private browsing mode. The method and apparatus for controlling a browser save the browsing data of a user in private browsing mode and prevent other users from accessing such data without the correct characteristic identifier.

16 Claims, 3 Drawing Sheets

(51) Int. Cl.
*H04L 29/08* (2006.01)
*G06F 21/32* (2013.01)
*G06F 17/30* (2006.01)

(56) References Cited

U.S. PATENT DOCUMENTS

2012/0198524 A1* 8/2012 Celebisoy ............ G06F 21/6263
726/5
2012/0317624 A1 12/2012 Monjas Llorente et al.

FOREIGN PATENT DOCUMENTS

| CN | 102622408 A | 8/2012 |
| CN | 102708141 A | 10/2012 |
| CN | 102789561 A | 11/2012 |

* cited by examiner

METHOD AND APPARATUS FOR CONTROLLING A BROWSER

CROSS-REFERENCE TO RELATED APPLICATIONS

This application is a continuation of International Patent Application No. PCT/CN2014/072930, entitled "Method and Apparatus for Controlling a Browser", filed on Mar. 5, 2014. This application claims the benefit and priority of Chinese Patent Application No. 201310068933.X, entitled "Method and Apparatus for Controlling a Browser", filed on Mar. 5, 2013. The entire disclosures of each of the above applications are incorporated herein by reference.

TECHNICAL FIELD

The present invention relates to the internet, more particularly, to a method and apparatus for controlling a browser.

BACKGROUND

As the internet develops, users are increasingly demanding better internet security features.

The current browsers have the following issues: any user can use the private browsing mode of the browser and access the bookmarks saved under the private browsing mode, and the bookmarks saved under the private browsing mode is not truly private; in the traceless browsing mode, the browser cannot save any browsing history, bookmarks and other webpage data that the user desires to save as private information.

Thus, there is a need to provide a browser that saves browsing history, bookmarks and other webpage data that a user wish to save as private information inaccessible to other users.

SUMMARY OF THE INVENTION

The embodiments of the present invention provide a method and apparatus for controlling a browser, where the browser can save browsing history, bookmarks and other webpage data that a user wish to save as private information inaccessible to other users, thereby enhancing the security of the browser.

In accordance with the embodiments of the present invention, a method for controlling a browser is provided, the method comprising: acquiring a characteristic identifier of a user; comparing the characteristic identifier of the user with a pre-stored benchmark characteristic identifier to determine whether the characteristic identifier is identical to the benchmark characteristic identifier; if the characteristic identifier is identical to the benchmark characteristic identifier, entering a pre-set private browsing mode wherein a browser plug-in saves the browsing history data of the user; and when the user completes the browsing, receiving an instruction from the user to close the plug-in and exit the private browsing mode.

In accordance with the embodiments of the present invention, an apparatus for controlling a browser is provided, the apparatus comprising: a characteristic identifier acquisition module for acquiring a characteristic identifier of a user; a characteristic identifier comparison module for comparing the characteristic identifier of the user with a pre-stored benchmark characteristic identifier to determine whether the characteristic identifier is identical to the benchmark characteristic identifier; a browser control module for controlling the browser, if the characteristic identifier is identical to the benchmark characteristic identifier, to enter a pre-set private browsing mode wherein a browser plug-in saves the browsing history data of the user; and when the user completes browsing, to receive an instruction from the user to close the plug-in and exit the private browsing mode.

The embodiments of the present invention acquire a characteristic identifier of a user before the user enters private browsing, compare such characteristic identifier with a pre-stored benchmark characteristic identifier to determine whether the characteristic identifier is identical to the benchmark characteristic identifier, if identical, enter into a private browsing mode wherein a browser plug-in saves the browsing history data of the user, and receive an instruction from the user to close the plug-in and exit the private browsing mode when the user completes the browsing. In accordance with the embodiments of the present invention, the browse enters a private browsing mode when it is determined that the characteristic identifier and the benchmark characteristic identifier are identical, and the browser saves browsing history, bookmarks and other webpage data of the user; after existing the private browsing mode, other users cannot enter the private browsing mode without the correct characteristic identifier; thus, access to the saved browsing data under the private browsing mode by other users is prevented, and browsing security is significantly enhanced.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate the purpose, technical features, and advantages of the embodiments of the present invention, various embodiments of the present invention will be further described in conjunction with the accompanying drawings.

The current browsers usually have a traceless browsing mode, wherein the browser will not record the user's browsing and search history. Furthermore, the current browsers also generally provide for a private browsing mode, wherein upon entering a new private browsing window, the browser will not save the browsing history, search history or cookies, but can save bookmarks under private browsing mode.

Figure 1:
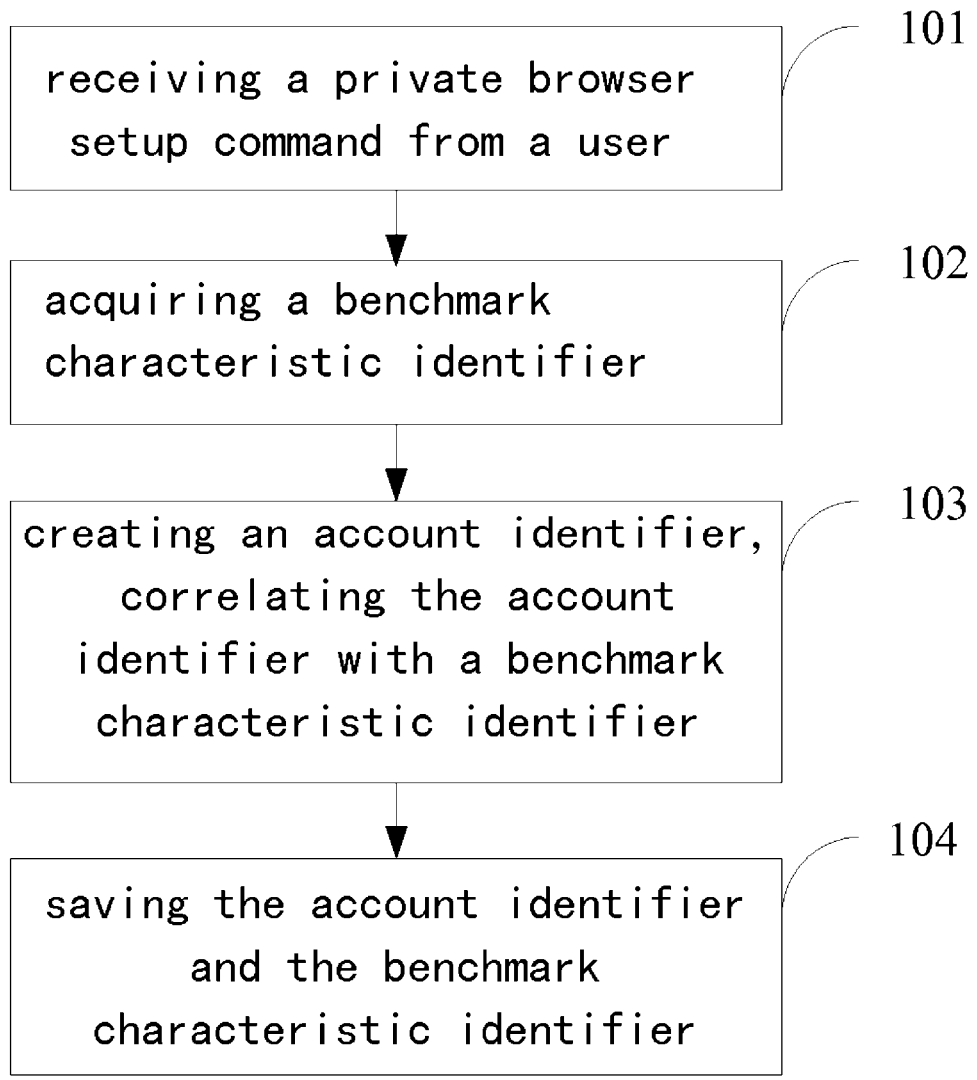
FIG. 1 is an exemplary flowchart for a method for controlling a browser in accordance with an embodiment of the present invention.

FIG. 1 is an exemplary flowchart for a method for controlling a browser in accordance with an embodiment of the present invention.

In Step 101, an instruction to set up private browsing is received from a user. Here, the private browsing mode may be set up by the user. For example, a browser plug-in can be added for entering or exiting private browsing. The plug-in may include an open button, a recording unit and a close button, wherein the open button is used to receive a private browsing instruction from the user to enter private browsing mode, the recording unit is used to record the browsing history data of the user, and the close button is used to receive instruction from the user to exit private browsing mode. To enter private browsing, the user may enter an open instruction using the open button, and the recording unit in private browsing will save the browsing history, bookmarks and other webpage data of the user (i.e., the browsing trace); to close private browsing, the user may enter a receive instruction using the closing button to close the plug-in and exit private browsing.

In Step 102, a benchmark characteristic identifier of the user is acquired.

Here, the characteristic identifier of the user refers to an identifier that is not arbitrary, and reflects a characteristic of the user. In this embodiment of the present invention, the benchmark characteristic identifier of the user may correspond to an identity identifier of the user, wherein the identity identifier may be created by facial, iris, fingerprint images or other characteristic images, or a user ID. The characteristic images used to create the identity identifier may include, but are not limited to, facial, iris, fingerprint images, et. al.

For example, the browser may use a pre-installed camera to scan a user's face, and acquire the user's facial image to create a benchmark characteristic identifier. The browser can also scan a user's picture to acquire the user's facial image. How to acquire a characteristic identifier of the user is not limited to these examples.

Specifically, the acquisition of a benchmark characteristic identifier may further include acquiring a user's facial image from a camera, encoding the facial image to generate an image code, for example a faceprint of the user, and saving the image code as a benchmark characteristic identifier thereafter.

In Step 103, an account identifier is created, and the account identifier is correlated with the benchmark characteristic identifier. The account identifier only needs to be able to uniquely identify the benchmark characteristic identifier.

In Step 104, the correlated account identifier and benchmark characteristic identifier are saved.

Figure 2:
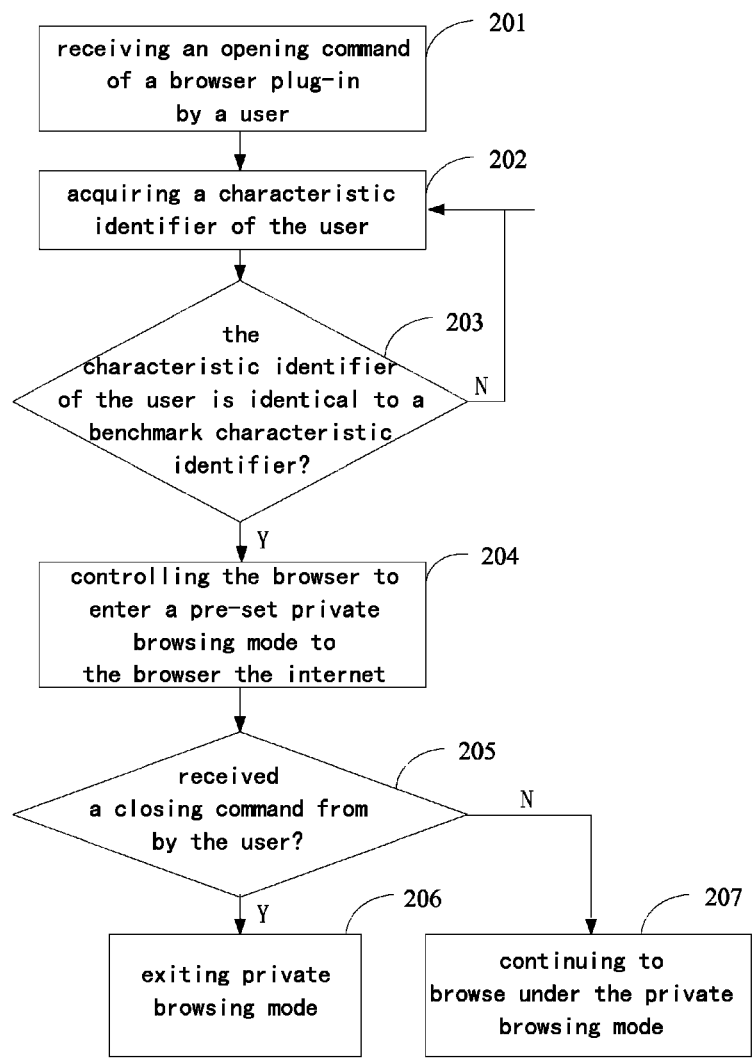
FIG. 2 is an exemplary flowchart for a method for controlling a browser in accordance with another embodiment of the present invention.

FIG. 2 is an exemplary flowchart of a method for controlling a browser in accordance with the embodiment of the present invention.

In Step 201, an instruction is received from the user to open a browser plug-in of the browser.

For example, the browser has a plug-in, and the plug-in may include an open button, a recording unit and a close button, wherein the open button is used to receive a private browsing instruction from the user to enter private browsing mode, the recording unit is used to record the browsing history data of the user, and the close button is used to receive instruction from the user to exit private browsing mode. To enter private browsing, the user may enter an open instruction using the open button.

In Step 202, the characteristic identifier of the user is acquired.

Here, the characteristic identifier of the user may correspond to an identity identifier of the user, wherein the identity identifier may be created by facial, iris, fingerprint images or other characteristic images, or a user ID. The characteristic images used to create the identity identifier may include, but are not limited to, facial, iris, fingerprint images, et. al. In the implementation of Step 202, the browser may acquire the facial image or iris image of the user through a camera.

In Step 203, the characteristic identifier of the user is compared to the pre-stored benchmark characteristic identifier; if they are identical, Step 204 is processed; otherwise, Step 202 is processed.

Because the pre-stored benchmark characteristic identifier is in encoded form, upon acquisition of the characteristic image, the characteristic identifier of the user may be created using the same encoding algorithm based on the characteristic image, and the characteristic identifier of the user with the benchmark characteristic identifier are compared in encoded form.

In Step 204, the browser enters a pre-set private browsing mode to browse the internet.

The browsing trace of the user, which includes browsing history, bookmarks, cookies or other webpage data, is saved under private browsing.

In Step 205, the browser determines whether an instruction to close the browser plug-in from the user is received; and if so, Step 206 is processed, if not, Step 207 is processed.

In Step 206, the browser exits private browsing. The user may exit private browsing by entering the close instruction using the close button of the browser plug-in.

The browsing trace of the user can be retained upon existing private browsing, but is not accessible to users in normal browsing mode. Thus, this embodiment saves the browsing trace of a user while keeping the browsing trace from being accessed by other users, thereby enhancing browser security.

In Step 207, the browser continues to browse in private browsing mode.

This embodiment of the present invention acquires a characteristic identifier of a user before the user enters private browsing, compares such characteristic identifier with a pre-stored benchmark characteristic identifier to determine whether the characteristic identifier is identical to the benchmark characteristic identifier, if identical, enters into a private browsing mode wherein the recording unit of a browser plug-in saves the browsing history data of the user, and receives an instruction from the user to close the plug-in and exit the private browsing mode when the user completes the browsing. In accordance with this embodiment of the present invention, the browse enters a private browsing mode when it is determined that the characteristic identifier and the benchmark characteristic identifier are identical, and the browser saves browsing history, bookmarks and other webpage data of the user; after existing the private browsing mode, other users cannot enter the private browsing mode without the correct characteristic identifier; thus, access to the saved browsing data under the private browsing mode by other users is prevented, and browsing security is significantly enhanced.

Figure 3:
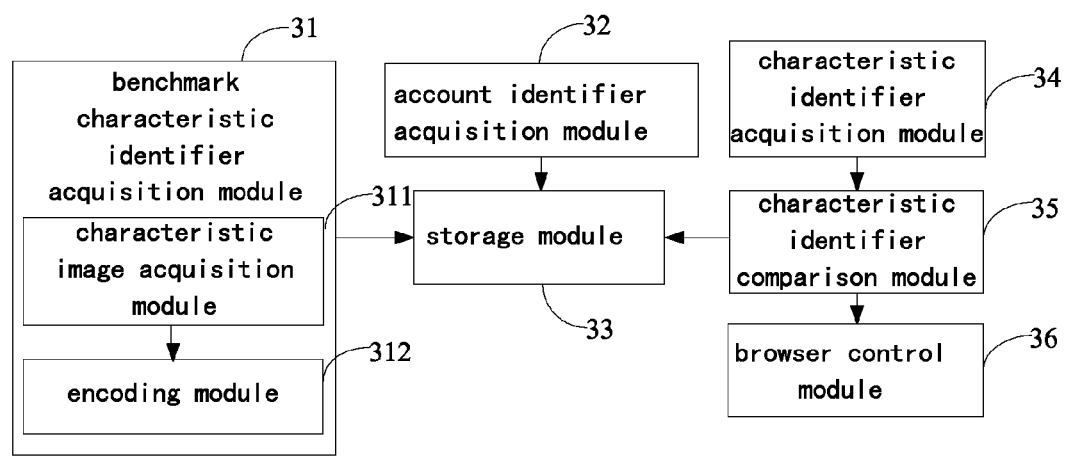
FIG. 3 is an exemplary schematic diagram for an apparatus for controlling a browser in accordance with yet another embodiment of the present invention.

FIG. 3 is an exemplary schematic diagram for an apparatus for controlling a browser in accordance with a third embodiment of the present invention. As shown in FIG. 3, the apparatus includes a benchmark characteristic identifier acquisition module 31, an account identifier acquisition module 32, a storage module 33, a characteristic identifier acquisition module 34, an identifier comparison module 35, and a browser control module 36.

The benchmark characteristic identifier acquisition module 31 can be used to acquire a characteristic identifier of the user, the account identifier acquisition module 32 can be used to create an account identifier, the storage module 33 can be used to correlate and save the characteristic identifier of the user and the account identifier.

The benchmark characteristic identifier acquisition module 31 includes a characteristic image acquisition module 311 and an encoding module 312. The characteristic image acquisition module 311 can be used to acquire a characteristic image of the user, and the encoding module 312 can be used to encode the characteristic image of the user to generate an image code for the characteristic image. The storage module 33 can be used to save the image code as a benchmark characteristic identifier.

The characteristic identifier acquisition module 34 can be used to acquire the characteristic identifier of the user, the identifier comparison module 35 can be used to compare and determine whether the characteristic identifier of the user is identical to the pre-stored benchmark characteristic identifier acquired by the benchmark characteristic identifier module 31; and the browser control module 36 can be used to control the browser to enter a pre-set private browsing mode whether the characteristic identifier of the user is identical to the pre-stored benchmark characteristic identifier. When the user completes browsing, the browser control module 36 can be used to receive an instruction from the user to close the plug-in and exit the private browsing mode.

The browser may include a plug-in, and the plug-in further comprises an open button, a recording unit and a close button. The open button can be used to receive instruction from the user to enter private browsing mode, the recording unit can be used to record the browsing trace of the user under the browser, and the close button can be used receive instruction from the user to exit private browsing mode. To enter private browsing, the user may enter an open command in the open button of the plug-in; the recording unit records the browsing trace of the user under private browsing; when the user completes browsing, the user may enter a close command in the close button of the plug-in to exit private browsing.

The benchmark characteristic identifier and the characteristic identifier of the user may correspond to the identity identifier of the user, wherein the identity identifier may be created by facial, iris, fingerprint images or other characteristic images, or a user ID. Please refer to the above description of the method for controlling a browser for a detailed description of the operational principles of the modules in the apparatus for controlling a browser.

This embodiment of the present invention acquires a characteristic identifier of a user before the user enters private browsing, compares such characteristic identifier with a pre-stored benchmark characteristic identifier to determine whether the characteristic identifier is identical to the benchmark characteristic identifier, if identical, enters into a private browsing mode wherein the recording unit of a browser plug-in saves the browsing history data of the user, and receives an instruction from the user to close the plug-in and exit the private browsing mode when the user completes the browsing. In accordance with this embodiment of the present invention, the browse enters a private browsing mode when it is determined that the characteristic identifier and the benchmark characteristic identifier are identical, and the browser saves browsing history, bookmarks and other webpage data of the user; after existing the private browsing mode, other users cannot enter the private browsing mode without the correct characteristic identifier; thus, access to the saved browsing data under the private browsing mode by other users is prevented, and browsing security is significantly enhanced.

Those skilled in the art will understand that all or part of the embodiments of the present invention can be implemented by computer hardware, or by a computer program controlling the relevant hardware. The computer program can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement made by a person of ordinary skill in the art that does not depart from the spirit and principles of the present invention.

What is claimed is:

1. A method for controlling a browser, comprising:
receiving an opening command of a browser plug-in by a user to enter a private browsing mode;
in response to the opening command, acquiring an image characteristic identifier of the user after entering the private browsing mode, wherein the image characteristic identifier is in encoded form;
comparing the image characteristic identifier of the user with a pre-stored benchmark image characteristic identifier to determine whether the image characteristic identifier is identical to the pre-stored benchmark image characteristic identifier;
when the image characteristic identifier is identical to the pre-stored benchmark image characteristic identifier, entering a pre-set private browsing mode to show browsing history data wherein the browser plug-in has a recording unit to save the browsing history data the user browsed earlier, wherein the browsing history data includes bookmarks, cookies, and other webpage data of the user;
receiving an instruction from the user on a close button of the browser plug-in to close the browser plug-in; and
exiting the private browsing mode and the pre-set private browsing mode in response to the instruction.

2. The method of claim 1, further comprising, prior to the receiving an opening command of a browser plug-in by a user to enter a private browsing mode:
acquiring a benchmark image characteristic identifier of the user and saving the benchmark image characteristic identifier as the pre-stored benchmark image characteristic identifier;
creating an account identifier, correlating the account identifier with the pre-stored benchmark image characteristic identifier, and
saving the account identifier.

3. The method of claim 2, wherein the acquiring of the benchmark image characteristic identifier of the user and saving the benchmark image characteristic identifier as the pre-stored benchmark image characteristic identifier further comprises:

acquiring a characteristic image of the user;
encoding the characteristic image to generate a characteristic image code; and
saving the characteristic image code as the pre-stored benchmark image characteristic identifier.

4. The method of claim 3, wherein the acquiring of the characteristic image of the user comprises capturing a facial image of the user using a camera, and the encoding the characteristic image to generate a characteristic image code comprises encoding the facial image to generate a faceprint.

5. The method of claim 1, wherein the acquiring of the image characteristic identifier of the user comprising capturing a facial image of the user using a camera.

6. The method of claim 1, prior to the receiving an instruction from the user on a close button of the browser plug-in, further comprising:
retaining the browsing history data the user browsed if an instruction on the recording unit of the browser plug-in is received.

7. An apparatus for controlling a browser, comprising:
a memory;
a user interface comprising a browser with a browser plug-in; and
at least one hardware processor coupled to the memory and the user interface, wherein:
the user interface is configured to receive an opening command of the browser plug-in by a user to enter a private browsing mode;
the user interface is also configured to acquire an image characteristic identifier of the user, wherein the image characteristic identifier is in encoded form;
the at least one hardware processor is configured to compare the image characteristic identifier of the user with a pre-stored benchmark image characteristic identifier stored in the memory to determine whether the image characteristic identifier is identical to the pre-stored benchmark image characteristic identifier;
the at least one hardware processor is configured to control the browser, when the image characteristic identifier is identical to the pre-stored benchmark image characteristic identifier, to enter a pre-set private browsing mode to show browsing history data wherein the browser plug-in has a recording unit to save the browsing history data the user browsed earlier, wherein the browsing history data includes bookmarks, cookies, and other webpage data of the user; and
the user interface is configured to receive an instruction from the user on a close button of the browser plug-in to close the browser plug-in and exit the private browsing mode and the pre-set private browsing mode.

8. The apparatus of claim 7, wherein:
the user interface is configured to acquire a benchmark image characteristic identifier of the user and the memory is configured to save the benchmark image characteristic identifier as the pre-stored benchmark image characteristic identifier;
the at least one hardware processor is configured to create an account identifier via the user interface; and
the at least one hardware processor is further configured to correlate the account identifier with the pre-stored benchmark image characteristic identifier, and
he memory is further configured to save the account identifier.

9. The apparatus of claim 8, wherein:
the user interface is configured to acquire a characteristic image of the user;
the at least one hardware processor is configured to encode the characteristic image to generate a characteristic image code; and
the memory is further configured to save the characteristic image code as the pre-stored benchmark image characteristic identifier.

10. The apparatus of claim 9, wherein:
the user interface comprises a camera for capturing a facial image of the user, and the at least one hardware processor is configured to encode the facial image to generate a faceprint.

11. The apparatus of claim 7, wherein the user interface comprises a camera for capturing a facial image of the user.

12. A non-transitory computer-readable medium for storing computer-executable instructions, the computer-executable instructions comprising a method for controlling a browser, the method comprising:
receiving an opening command of a browser plug-in by a user to enter a private browsing mode;
acquiring an image characteristic identifier of the user after entering the private browsing mode, wherein the image characteristic identifier is in encoded form;
comparing the image characteristic identifier of the user with a pre-stored benchmark image characteristic identifier to determine whether the image characteristic identifier is identical to the pre-stored benchmark image characteristic identifier;
when the image characteristic identifier is identical to the pre-stored benchmark image characteristic identifier, entering a pre-set private browsing mode to show browsing history data wherein the browser plug-in has a recording unit to save the browsing history data the user browsed earlier, wherein the browsing history data includes bookmarks, cookies, and other webpage data of the user; and
after the user completes the browsing, receiving an instruction from the user on a close button of the browser plug-in to close the browser plug-in and exit the private browsing mode and the pre-set private browsing mode.

13. The non-transitory computer-readable medium of claim 12, further comprising, prior to the receiving an opening command of a browser plug-in by a user to enter a private browsing mode:
acquiring a benchmark image characteristic identifier of the user and saving the benchmark image characteristic identifier as the pre-stored benchmark image characteristic identifier;
creating an account identifier, correlating the account identifier with the pre-stored benchmark image characteristic identifier, and
saving the account identifier.

14. The non-transitory computer-readable medium of claim 13, wherein the acquiring of the benchmark image characteristic identifier of the user and saving the benchmark characteristic identifier as the pre-stored benchmark image characteristic identifier further comprises:
acquiring a characteristic image of the user;
encoding the characteristic image to generate a characteristic image code; and
saving the characteristic image code as the pre-stored benchmark image characteristic identifier.

15. The non-transitory computer-readable medium of claim 14, wherein the acquiring of the characteristic image of the user comprises capturing a facial image of the user using a camera, and the encoding the characteristic image to generate a characteristic image code comprises encoding the facial image to generate a faceprint.

16. The non-transitory computer-readable medium of claim 12, wherein the acquiring of the image characteristic identifier of the user comprises capturing a facial image of the user using a camera.

\* \* \* \* \*